(12) United States Patent
McNair et al.

(10) Patent No.: US 8,839,350 B1
(45) Date of Patent: Sep. 16, 2014

(54) SENDING OUT-OF-BAND NOTIFICATIONS

(75) Inventors: D. Trent McNair, Boise, ID (US); John Mears, Abingdon (GB); David Shapcott, North York, CA (US)

(73) Assignee: Symantec Corporation, Mountain View, CA (US)

( * ) Notice: Subject to any disclaimer, the term of this patent is extended or adjusted under 35 U.S.C. 154(b) by 0 days.

(21) Appl. No.: 13/358,501

(22) Filed: Jan. 25, 2012

(51) Int. Cl.
*G06F 17/00* (2006.01)

(52) U.S. Cl.
USPC ............................................................ 726/1

(58) Field of Classification Search
CPC .................................................... H04L 63/107
USPC .......................................................... 726/1
See application file for complete search history.

(56) References Cited

U.S. PATENT DOCUMENTS

| | | | |
|---|---|---|---|
| 7,533,131 B2 * | 5/2009 | Thomas et al. ........................ 1/1 |
| 7,552,174 B1 * | 6/2009 | Cramer et al. ................. 709/203 |
| 7,930,750 B1 * | 4/2011 | Gauvin et al. ................... 726/24 |
| 8,037,295 B2 * | 10/2011 | Lin ................................. 713/150 |
| 2002/0129064 A1 * | 9/2002 | Guthrie ......................... 707/513 |
| 2004/0098476 A1 * | 5/2004 | Kawase et al. ................. 709/223 |
| 2004/0172389 A1 * | 9/2004 | Galai et al. ......................... 707/3 |
| 2005/0267981 A1 * | 12/2005 | Brumley et al. .............. 709/232 |
| 2006/0190719 A1 * | 8/2006 | Rao et al. ....................... 713/160 |
| 2007/0180147 A1 * | 8/2007 | Leigh ............................. 709/246 |
| 2010/0030891 A1 * | 2/2010 | Kim et al. ...................... 709/224 |
| 2010/0269171 A1 * | 10/2010 | Raz et al. ......................... 726/13 |
| 2010/0325615 A1 * | 12/2010 | Ramot ........................... 717/124 |
| 2011/0125894 A1 * | 5/2011 | Anderson et al. ............. 709/224 |
| 2012/0017271 A1 * | 1/2012 | Smith et al. ..................... 726/19 |
| 2012/0023487 A1 * | 1/2012 | Letca et al. ................... 717/130 |

* cited by examiner

*Primary Examiner* — Techane Gergiso
(74) *Attorney, Agent, or Firm* — Fenwick & West LLP (57) ABSTRACT

Out-of-band notifications are used to inform users of clients of security policy enforcement actions, such as enforcement of a data loss prevention (DLP) policy. Code for instantiating a notification agent at a client used by a user is inserted into network traffic inbound to the client. Outbound network traffic sent from the client to a server is monitored for compliance with one or more security policies. If it is determined that the network traffic violates a security policy, an enforcement action is taken. An out-of-band notification message describing the enforcement action is inserted into a response to the outbound network traffic and sent to the client. The notification agent at the client receives the notification message and presents the message to the user.

16 Claims, 5 Drawing Sheets

SENDING OUT-OF-BAND NOTIFICATIONS

BACKGROUND

1. Field of Art

The present invention generally relates to the field of computer security and in particular to notifying users of security-related actions performed on network traffic.

2. Background of the Invention

An enterprise typically stores a large amount of resources including data and applications. Allowing a relatively free flow of data within the enterprise is important in enabling the enterprise to operate efficiently. However, in many cases it will also be important to the enterprise that the same data do not leak outside of the enterprise's own network. For example, it could be disastrous for a company to have new product designs and specifications reach a competitor before the market. In the modern web-connected work environment, the risk that such data will be leaked digitally, either maliciously or accidentally, is significant.

To mitigate this risk, many enterprises implement and enforce data loss prevention (DLP) policies for their networks. Enforcing these policies typically involves monitoring outbound network traffic and preventing certain types of data from leaving the enterprise. When a policy is applied to network traffic from a particular user, the user is typically notified that the user's actions violated the DLP policy.

However, in certain situations the notification of the policy violation can have undesirable side effects. For example, if the user violates the DLP policy while using a web browser to access a web site, attempting to notify the user of the violation by causing the web browser to display an informational web page can result in the browser displaying confusing or generic error messages. This problem is particularly acute for asynchronous web applications because directing the browser to a new web page may break the web application.

SUMMARY

The above and other issues are addressed by a computer-implemented method, non-transitory computer readable storage medium, and computer system for sending an out-of-band notification of a security policy enforcement action to a user of a client. An embodiment of the method comprises receiving outbound network traffic sent from a client to a server and performing an enforcement action on the network traffic responsive to determining that the network traffic violates a security policy. The method also comprises inserting an out-of-band notification message describing the enforcement action into a response to the outbound network traffic and sending the response, including the inserted out-of-band notification message, to the client.

An embodiment of the non-transitory computer-readable storage medium stores executable computer program instructions for sending an out-of-band notification of a security policy enforcement action to a user of a client, the instructions executable to perform steps comprising receiving outbound network traffic sent from a client to a server and performing an enforcement action on the network traffic responsive to determining that the network traffic violates a security policy. The method also comprises inserting an out-of-band notification message describing the enforcement action into a response to the outbound network traffic and sending the response, including the inserted out-of-band notification message, to the client.

An embodiment of the computer system for sending an out-of-band notification of a security policy enforcement action to a user of a client comprises a non-transitory computer-readable storage medium storing executable computer program instructions comprising instructions for receiving outbound network traffic sent from a client to a server and performing an enforcement action on the network traffic responsive to determining that the network traffic violates a security policy. The method also comprises inserting an out-of-band notification message describing the enforcement action into a response to the outbound network traffic and sending the response, including the inserted out-of-band notification message, to the client. The computer system further comprises a processor for executing the computer program instructions.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
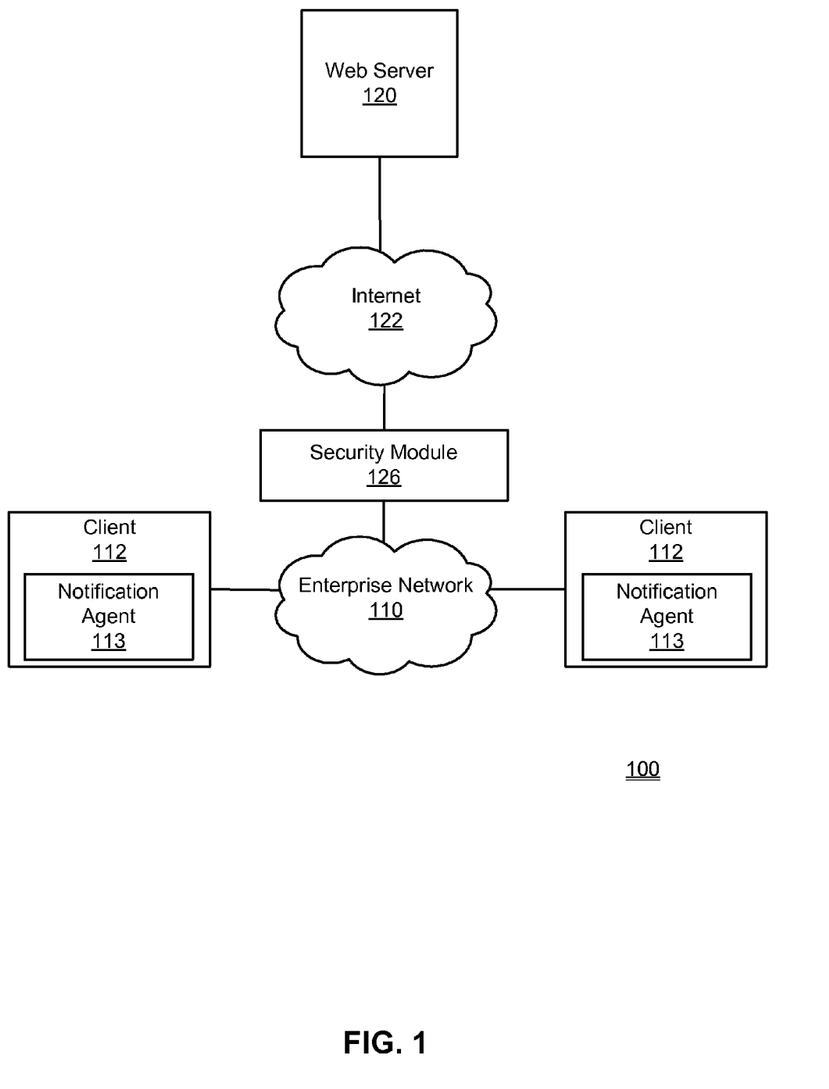
FIG. 1 is a high-level block diagram illustrating an embodiment of a networked environment includes an enterprise network connected to the Internet.

FIG. 1 is a high-level block diagram illustrating an embodiment of a networked environment 100 including an enterprise network 110 connected to the Internet 122. The enterprise network 110 is maintained by an enterprise, such as a business, school, or government agency in order to provide connectivity to various computers and other electronic devices supported by the enterprise.

The enterprise network 110 and Internet 122 represent communication pathways between entities connected to these networks. In one embodiment, these networks 110, 122 use standard communications technologies and/or protocols. Thus, the networks 110, 122 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the networks 110, 122 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the networks 110, 122 can be represented using technologies and/or formats including image data in binary form (e.g. Portable Network Graphics (PNG)), the hypertext markup language (HTML), the extensible markup language (XML), Asynchronous JavaScript and XML (AJAX), etc. In addition, all or some connections can be encrypted using conventional encryption technologies such as secure sockets layer (SSL), transport layer security (TLS), HTTP Secure (HTTPS), virtual private networks (VPNs), Internet Protocol security (IPsec), etc. In another embodiment, the entities on the networks 110, 122 use custom and/or dedicated data communications technologies instead of, or in addition to, the ones described above.

FIG. 1 shows a web server 120 connected to the enterprise network 110 via the Internet 122. A web server 120 may host applications, web sites, data repositories, and other such content. For example, the web server 120 may host a web-based application that includes JavaScript or other code for executing in a web browser to provide functionality. In particular, the web server 120 may host a web-based application that uses AJAX-based technology that supplies the browser with an anchor page, and then asynchronously updates content on that page without the browser leaving the anchor page. Although only one web server 120 is shown for clarity, in practice, the Internet 122 connects many such servers.

Enterprise clients 112 are connected to the enterprise network 110. A client 112 is a computer or other electronic device used by one or more users to execute applications for performing various activities associated with the enterprise. For example, a client 112 can be a desktop, notebook, or tablet computer, a mobile telephone, or a television set-top box. The applications executed by a client 112 may include web browsers, word processors, spreadsheets, etc. In one embodiment, a user uses a web browser executing on a client 112 web browser to access resources stored locally by the enterprise and send these resources outside of the enterprise. For example, a user may use a web browser to execute a web application received from the web server 120 to upload a file or other collection of data to the web server 120. Although only two clients 112 are shown in FIG. 1 for clarity, enterprises can include many clients.

The enterprise clients 112 each include a notification agent 113. The agent 113 provides the user of the client 112 with notifications related to the user's actions. In one embodiment, the agent 113 notifies the user if the user's actions violate an enterprise security policy. For example, if the user attempts to use a web browser to submit data to a remote web server 120 in violation of a DLP policy, the notification agent 113 notifies the user that the user's submission was blocked and explains the basis for the violation. In one embodiment, the notification agent 113 is provided by a JavaScript application that is included in web content received and executed by a client web browser. The notification agent 113 may also be a browser plug-in, integrated into the browser, an operating system, or other functionality on the client 112.

A security module 126 monitors outbound network traffic passing from the enterprise network 110 to the Internet 122 for compliance with one or more security policies established by the enterprise. In one embodiment, the security module 126 executes on a proxy server or other computing device connected to the enterprise network 110. The proxy server may provide additional functionality, such as acting as a firewall to prevent undesirable inbound traffic from entering the enterprise network 110 from the Internet 122.

In one embodiment, the security module 126 monitors outbound network traffic for compliance with a DLP policy. However, other embodiments may monitor for compliance with other types of security policies. If the security module 126 detects a violation of the security policy within outbound traffic from a client 112, it applies an enforcement action to the traffic such as blocking the traffic or redacting certain data from the traffic.

In addition, the security module 126 sends a notification message to the notification agent 113 of the client 112 from which the network traffic was received. The notification message causes the notification agent 113 to present a message to the user of the client 112 describing the reasons why a security policy was enforced against the network traffic. For example, the notification message may cause the notification agent 113 to display a message stating that the outbound network traffic was blocked due to violating the enterprise's DLP policy.

In one embodiment, the security module 126 sends the notification message to the notification agent 113 using an out-of-band communications channel. The channel is considered out-of-band because it is outside of the communications channel between the client's web browser and the web server 120 (or other entity) with which the client 112 is communicating when the security policy was triggered. Using out-of-band messaging allows the security module 126 to send notification messages to the notification agent 113 without disrupting the data flow between the web browser and web server 120. The browser does not need to display a new web page or perform other actions that might interfere with a web application provided by the web server 120. As a result, undesirable side-effects due to the notifications, such as causing the client's web browser to display an error message or breaking the web application, are avoided. Therefore, the out-of-band messaging allows the security module 126 to present a message to the user of the client 112 without unnecessarily disrupting the user's web experience.

Figure 2:
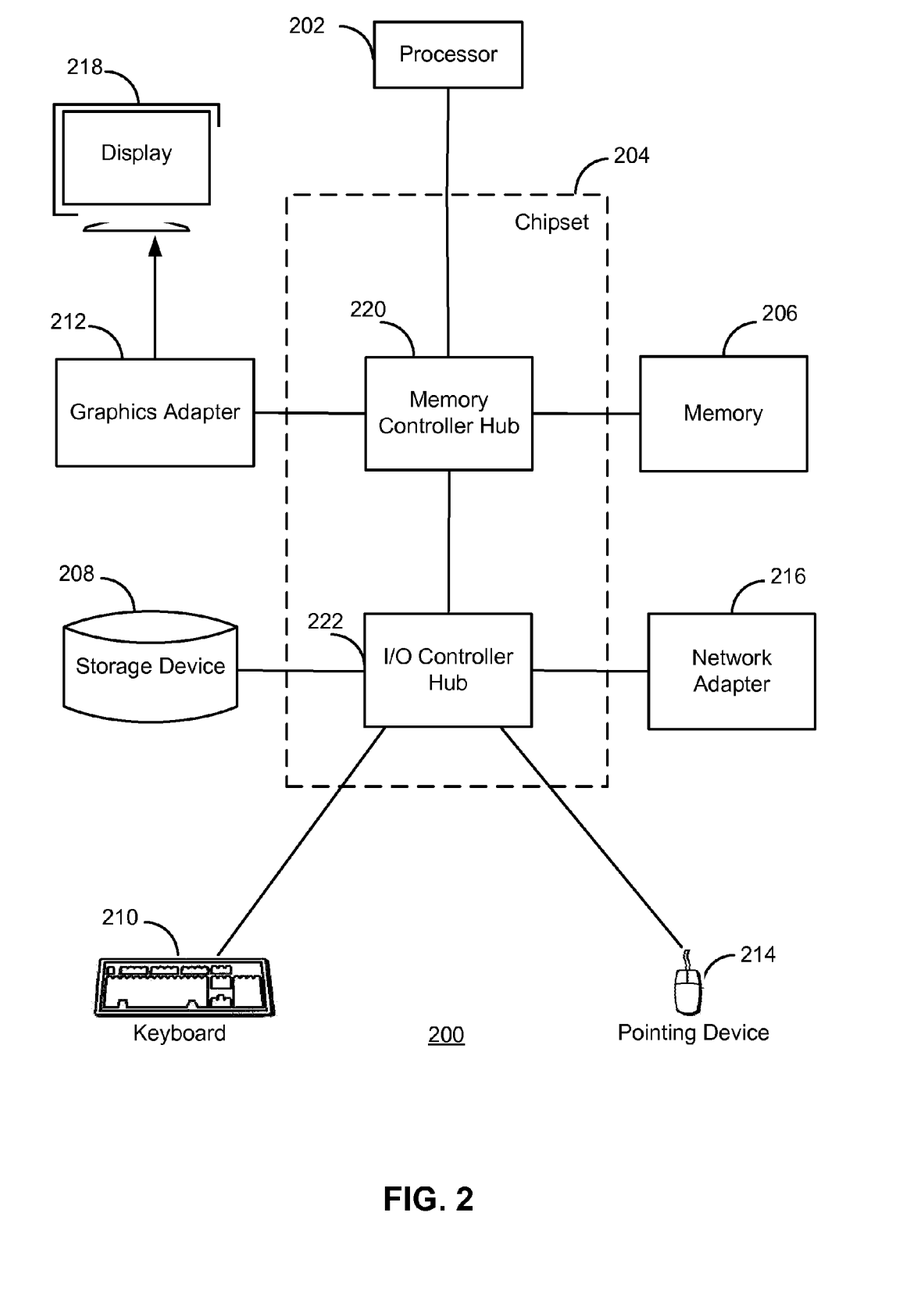
FIG. 2 is a high-level block diagram illustrating an example of a computer for use as a client, a proxy server implementing the security module and/or to implement the other entities described in FIG. 1.

FIG. 2 is a high-level block diagram illustrating an example of a computer 200 for use as a client 112, a proxy server implementing the security module 126 and/or to implement the other entities described in FIG. 1. Illustrated are at least one processor 202 coupled to a chipset 204. The chipset 204 includes a memory controller hub 250 and an input/output (I/O) controller hub 255. A memory 206 and a graphics adapter 213 are coupled to the memory controller hub 250, and a display device 218 is coupled to the graphics adapter 213. A storage device 208, keyboard 210, pointing device 214, and network adapter 216 are coupled to the I/O controller hub 255. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is used in combination with the keyboard 210 to input data into the computer system 200. The graphics adapter 213 displays images and other information on the display device 218. In some embodiments, the display device 218 includes a touch screen capability for receiving user input and selections. The network adapter 216 couples the computer system 200 to the enterprise network 110 and/or Internet 122. Some embodiments of the computer 200 have different and/or other components than those shown in FIG. 2. For example, a server implementing the security module 126 can be formed of multiple blade servers and lack a display device, keyboard, and other components.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

Figure 3:
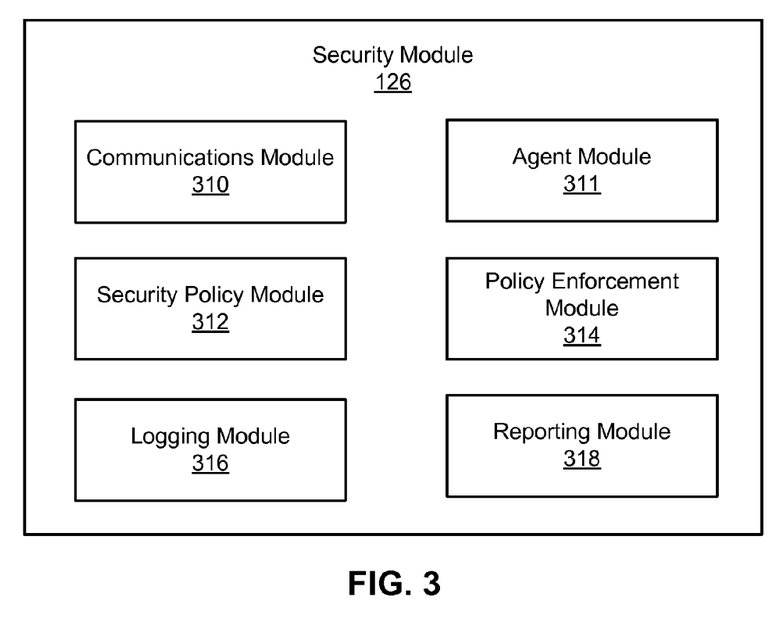
FIG. 3 is a high-level block diagram illustrating a detailed view of the security module, according to one embodiment.

FIG. 3 is a high-level block diagram illustrating a detailed view of the security module 126, according to one embodiment. The security module 126 includes multiple modules itself: a communications module 310, an agent module 311, a security policy module 312, a policy enforcement module 314, a logging module 316, and a reporting module 318. In some embodiments, the functions are distributed among the modules in a different manner than described herein. In addition, some embodiments include different and/or other modules.

The communications module 310 supports communications between the enterprise clients 112 and the web servers 120 on the Internet. In one embodiment, the communications module 310 intercepts outbound network traffic sent by the clients 112 to the web servers 120 and provides the traffic to the other modules within the security module 126. Likewise, the communication module 310 intercepts inbound network traffic sent to the clients 112 by the web servers 120 and provides the traffic to the other modules within the security module 126.

The agent module 311 instantiates notification agents 113 in the enterprise clients 112. Assume for purposes of this discussion that the client notification agents 113 are provided by JavaScript code executed by web browsers at the clients 112. To this end, the agent module 311 monitors network traffic being sent from web servers 120 to enterprise clients 112 and selectively inserts agent code for instantiating the notification agents 113 in the network traffic. When this code reaches a web browser on a client 112, the web browser automatically executes the agent code and instantiates the notification agent 113 for the client.

In one embodiment, the agent module 311 monitors network traffic directed to the clients 112 to detect network traffic containing a web page. The agent module 311 injects the agent code for instantiating the notification agent 113 into the web page. In one embodiment, the agent module 311 inspects the page to identify the structure of the page, and injects the agent code into a location that causes the code to be executed before any other code (i.e., JavaScript code) in the page. For example, the agent module 311 may inject the agent code at a location of the web page that is parsed by the web browser prior to any other locations where code may reside.

Further, in one embodiment the agent module 311 injects the agent code into only certain web pages detected in network traffic directed to the clients 112. The agent module 311 inspects web pages in network traffic to identify a response from a web server 120 to a client 112 that contains an anchor page, such as a base page for a web application provided by a website. If the inspection reveals that a page is an anchor page, the agent module 311 inserts the agent code into the page. Otherwise, the agent module 311 does not insert the agent code.

The security policy module 312 manages and stores the security policies for the enterprise 110. In one embodiment the security policies are created and/or modified by an administrator for the enterprise and provided to the security policy module 312. As mentioned above, the security policies may include a DLP as well as other types of policies. The same security policies may be applied to all enterprise network traffic or specific policies may be applied to specific traffic, clients 112, and/or users.

The policy enforcement module 314 enforces security policies on the enterprise's network traffic. In one embodiment, the policy enforcement module 314 receives network traffic outbound from the enterprise network 110 to the Internet 122 and identifies any security policies maintained by the security policy module 312 that are applicable to the network traffic. The policy enforcement module 314 then examines the network traffic for compliance with the applicable policies. For example, if a DLP policy specifies types of data that are not allowed to be in network traffic that leaves the enterprise, the policy enforcement module 314 enforces the DLP policy by examining network traffic to ensure that it does not contain any of the specified types of data. Depending upon the security policies, the policy enforcement module 314 may also examine network traffic inbound to the enterprise network 110 for compliance with security policies.

The policy enforcement module 314 may perform a variety of different enforcement actions on network traffic that is non-compliant with a security policy. For a DLP policy, the enforcement actions generally prohibit the specified data from leaving the enterprise. Thus, the enforcement actions for the DLP policy may include blocking the network traffic that contains the data and/or redacting the specified data from the traffic but allowing the remainder the traffic to pass out of the enterprise network 110.

The logging module 316 records (i.e., logs) enforcement actions performed on the network traffic in a log. The logging module 316 logs identification data in association with the enforcement actions that identify the client 112 that sent the traffic, the web server 120 to which the traffic was directed and/or other information. The identification data allow for the correlation of subsequent inbound traffic received from a web server 120 on the Internet 122 with previous outbound traffic to the web server on which an enforcement action was performed. In addition, the identification data allow for the identification of outbound network traffic that is blocked by the policy enforcement module 314. In one embodiment, the logging module 316 also records the reason that the enforcement actions were performed against the network traffic. For example, the recorded reason may indicate which security policy was applied and how the network traffic violated the policy.

A reporting module 318 reports violations of security policies to users of the clients 112. In one embodiment, the reporting module 318 examines the log recorded by the logging module 316 to identify outbound network communications that were blocked. In addition, the reporting module 318 identifies communications inbound from the Internet 122 to the enterprise network 110 that correlate to outbound network traffic on which enforcement actions were performed. The logging module 316 also examines the log to determine the reasons that the enforcement actions were performed.

The reporting module 318 uses the log information to generate notification messages to the clients 112 describing the reasons that enforcement actions were performed on network traffic from those clients. In one embodiment, the reporting module 318 sends a notification message to a client 112 from which network traffic was blocked in real time, i.e., contemporaneously with the performance of the enforcement action. The reporting module 318 also sends a notification message to a client 112 from which data in network traffic was redacted in real time, i.e., contemporaneously with receiving a response to a web server 120 to which the redacted information was provided. For example, if information is redacted from a HTTP POST message sent from a client web browser to a web server 120, the reporting module 318 sends a notification message to the client upon receiving the HTTP RESPONSE to the POST from the web server.

The reporting module 318 sends the notification message to the notification agent 113 of the client 112 using an out-of-band communications channel. In one embodiment, the out-of-band communications channel is formed by inserting one or more "X" headers, e.g., "X-Notification" headers, into a response message sent to the client 112 that describe the notification message. An "X" header is a field in the HTTP message beginning with the letter "X." The "X" marks the header as containing information that is not part of the HTTP standard. The headers may be included in a response to the blocked communication generated by the reporting module 318 and/or inserted into a response received from a web server 120 on the Internet 122. A digital signature may also be included in a header, e.g., in an "X-Notify-Sig" header field included in the response message. The digital signature serves to authenticate and prevent alteration of the notification message.

The inserted headers forming the notification message are thus carried in the inbound HTTP response to the outbound HTTP communication from the client 112. This may be the same response that is used by a web application provided by the web server to communicate with the client 112. Nevertheless, the headers form an out-of-band communication channel because the notification message is essentially "invisible" to entities other than the notification agent 113. Due to its instantiation within the web browser, the notification agent 113 can extract and parse the notification message from the headers without interfering with the regular operation of the web browser and web application.

In other embodiments, the notification message is sent via an out-of-band channel that is independent of the response. For example, the notification message may be sent in an email or instant message (IM) to an account of the user using the client 112, or via a SMS text message or automated phone call to a phone number associated with the user.

Figure 4:
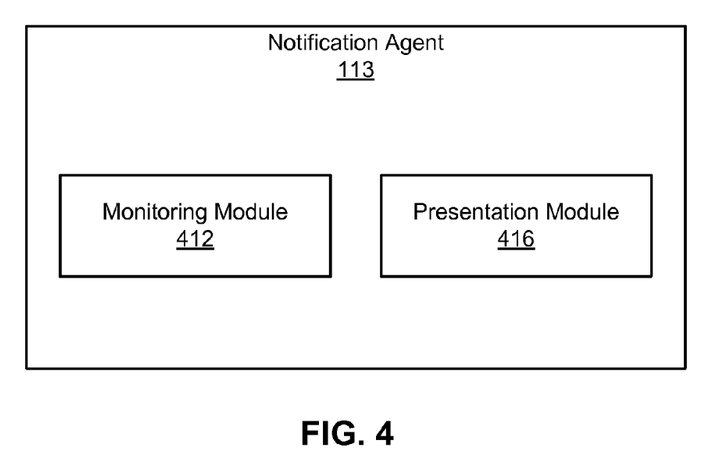
FIG. 4 is a high level block diagram illustrating a detailed view of the notification agent of a client, according to one embodiment.

FIG. 4 is a high level block diagram illustrating a detailed view of the notification agent 113 of a client 112, according to one embodiment. The notification agent 113 includes a monitoring module 412 and a presentation module 416. In some embodiments, the functions are distributed among the modules in a different manner than described herein. In addition, some embodiments include different and/or other modules.

The monitoring module 412 intercepts incoming communications received by the client 112 and identifies any out-of-band notification messages in the communications. For example, in the earlier described embodiment where a notification message is included as an X-Header in an HTTP response, the monitoring module 412 inspects the headers of HTTP responses received by the client web browser to identify any responses having X-Headers from the security module 126. If one or more X-Headers from the security module 126 are found, the monitoring module 412 parses the headers to identify the notification message, and generates a message to the user of the client 112 describing the reasons that an enforcement action was performed on outbound network traffic. The monitoring module 412 may also verify any digital signatures contained in the out-of-band notification messages to verify and authenticate the notification messages.

The presentation module 416 presents the notification message to the user of the client 112. In one embodiment, the presentation includes a textual and/or graphical message displayed on a display device of the client. The notification is presented, for example, as text in a pop up window, a dialogue box, or an iFrame of a web page. Since the notification does not require the web browser to load a new web page (aside from possibly loading a page into an iFrame), the notification does not interfere with other operations of the web browser. Moreover, the presentation module 416 presents the notification message in real-time, when the enforcement action is applied to the network traffic.

Figure 5A:
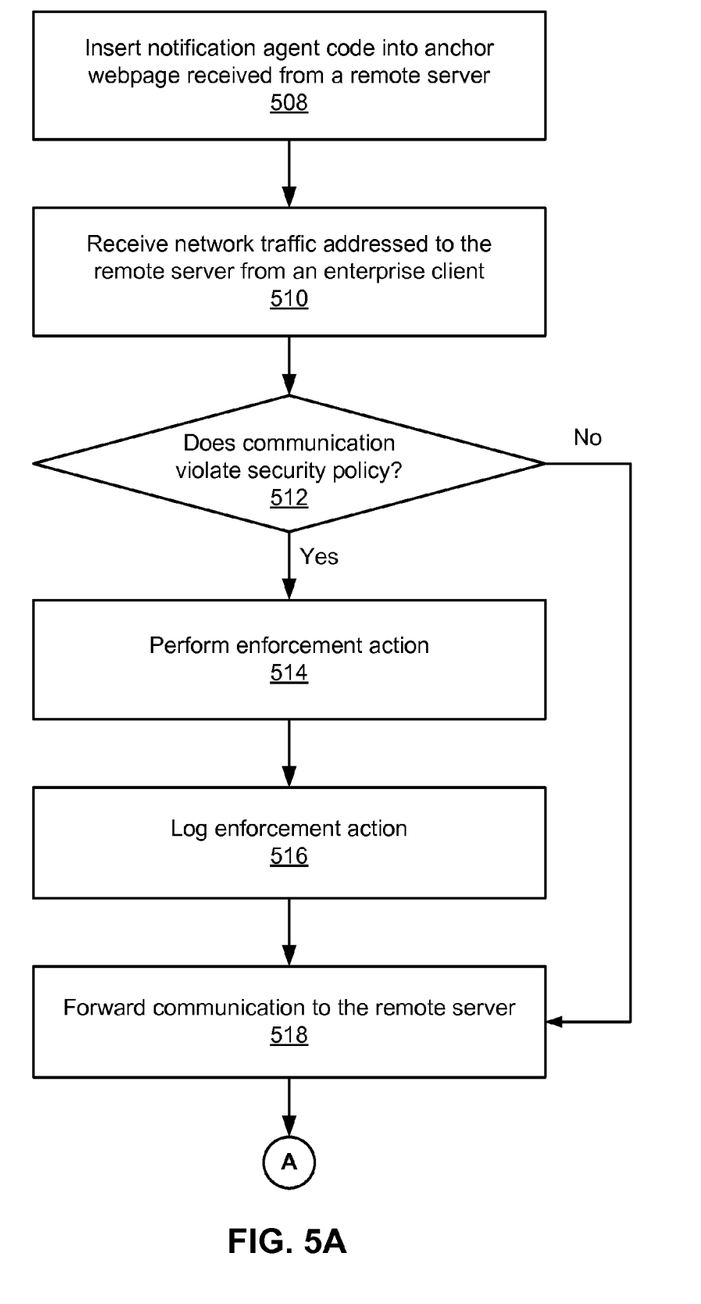
FIG. 5 is a flowchart illustrating a method for sending out-of-band notifications of security policy enforcement actions, according to one embodiment.
Figure 5B:
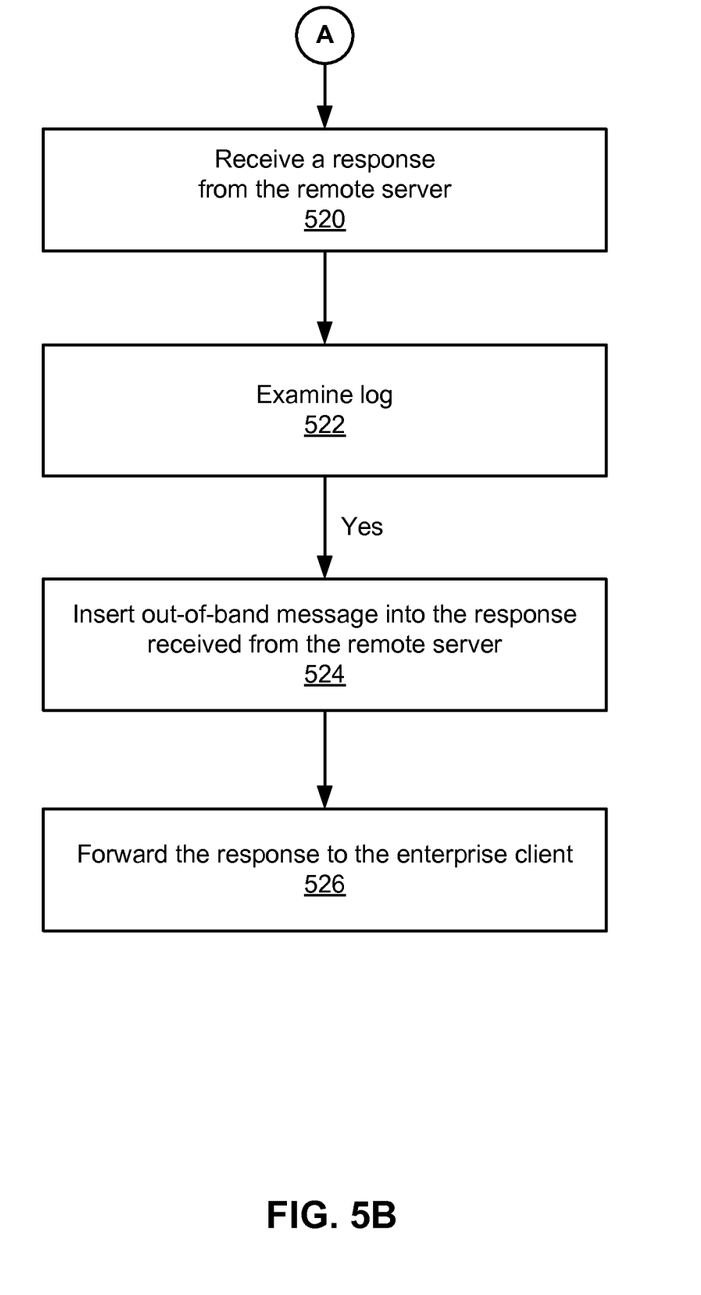

FIG. 5 is a flowchart illustrating a method for sending out-of-band notifications of security policy enforcement actions, according to one embodiment. In the embodiment shown, the steps of the method are performed by the security module 126. In other embodiments, some or all of these steps are performed by other entities. Additionally, the method may perform the steps in different orders or include different and/or additional steps.

A connection is established between an enterprise client 112 and a remote web server 120, for example when a user directs a web browser to an anchor webpage. The security module 216 detects the anchor webpage in incoming network traffic and inserts 508 code for instantiating a notification agent 113 on the enterprise client 112. When the webpage is rendered by the web browser on the enterprise client, the code is automatically executed, and the notification agent 113 instantiated.

The security module 126 receives 510 outbound network traffic, addressed to the remote web server 120, and originating from the enterprise client 112. The security module 126 examines 512 the traffic to determine if it violates a security policy. If the traffic violates a security policy, then the security module 126 performs 514 an enforcement action, such as blocking or redacting data in the traffic. The security module 126 logs 516 the enforcement action and, if the network traffic is not blocked, forwards 518 the modified network traffic to the remote server to which it is addressed. If no security policy violations were detected when the traffic was examined 512, then the communication is forwarded 518 unchanged to the remote server 120.

Upon receiving 520 a response to a redacted network communication from the remote server, or contemporaneously with when the outbound network traffic was blocked, the security module 126 examines 522 the log to determine the reasons that the enforcement action was performed. The security module 126 inserts 526 an out-of-band notification message into the response. The response, now including the out-of-band notification message, is then forwarded 526 to the enterprise client 112 from which the initial communication originated. The notification agent 113 in the client 112 receives the out-of-band notification message and presents it to the user of the client.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The above description is included to illustrate the operation of certain embodiments and is not meant to limit the scope of the invention. The scope of the invention is to be limited only by the following claims. From the above discussion, many variations will be apparent to one skilled in the relevant art that would yet be encompassed by the spirit and scope of the invention.

The invention claimed is:

1. A computer-implemented method for sending an out-of-band notification of a security policy enforcement action to a user of a client, the method comprising:
receiving outbound network traffic sent from the client to a server, the outbound network traffic comprising a hypertext transport protocol (HTTP) POST message;
analyzing the HTTP POST message to determine whether the message contains data violating a data loss prevention (DLP) policy of an enterprise with which the client is associated;
responsive to a determination that the message contains data violating the DLP policy, performing an enforcement action by blocking the message from reaching the server or redacting the data violating the DLP policy from the message;
inserting an out-of-band notification message describing the enforcement action into a response to the outbound network traffic; and
sending the response including the inserted out-of-band notification message to the client.

2. The method of claim 1, wherein inserting the out-of-band notification message comprises:
inserting one or more headers describing the notification message into a HTTP RESPONSE message that forms a response to the HTTP POST message in the received outbound network traffic.

3. The method of claim 2, wherein the inserted headers comprise one or more headers marked as containing information that is not part of a HTTP standard.

4. The method of claim 1, wherein the inserted out-of-band notification message comprises a digital signature that serves to authenticate the notification message.

5. The method of claim 1, further comprising:
receiving inbound network traffic from the server to the client;
analyzing the received inbound network traffic; and
selectively injecting agent code into the inbound network traffic responsive to the analysis of the received inbound network traffic, the agent code adapted to execute at the client to instantiate a notification agent at the client, the notification agent adapted to receive the inserted out-of-band notification message and present the notification message to a user of the client.

6. The method of claim 5, wherein analyzing the received inbound network traffic comprises examining the inbound network traffic from the server to the client to detect inbound network traffic containing a web page acting as an anchor page for a web application provided by the server and the selectively injecting injects the agent code into the web page acting as the anchor page for the web application and does not inject the agent code into web pages not acting as the anchor page for the web application.

7. A non-transitory computer-readable storage medium storing executable computer program instructions for sending an out-of-band notification of a security policy enforcement action to a user of a client, the instructions executable to perform steps comprising:
receiving outbound network traffic sent from the client to a server, the outbound network traffic comprising a hypertext transport protocol (HTTP) POST message;
analyzing the HTTP POST message to determine whether the message contains data violating a data loss prevention (DLP) policy of an enterprise with which the client is associated;
responsive to a determination that the message contains data violating the DLP policy, performing an enforcement action by blocking the message from reaching the server or redacting the data violating the DLP policy from the message;
inserting an out-of-band notification message describing the enforcement action into a response to the outbound network traffic; and
sending the response including the inserted out-of-band notification message to the client.

8. The computer-readable storage medium of claim 7, wherein inserting the out-of-band notification message comprises:
inserting one or more headers describing the notification message into a HTTP RESPONSE message that forms a response to the HTTP POST message in the received outbound network traffic.

9. The computer-readable storage medium of claim 7, wherein the inserted out-of-band notification message comprises a digital signature that serves to authenticate the notification message.

10. The computer-readable storage medium of claim 7, further comprising:
receiving inbound network traffic from the server to the client;
analyzing the received inbound network traffic; and
selectively injecting agent code into the inbound network traffic responsive to the analysis of the received inbound network traffic, the agent code adapted to execute at the client to instantiate a notification agent at the client, the notification agent adapted to receive the inserted out-of-band notification message and present the notification message to a user of the client.

11. The computer-readable storage medium of claim 10, wherein analyzing the received inbound network traffic comprises examining the inbound network traffic from the server to the client to detect inbound network traffic containing a web page acting as an anchor page for a web application provided by the server and the selectively injecting injects the agent code into the web page acting as the anchor page for the web application and does not inject the agent code into web pages not acting as the anchor page for the web application.

12. A computer system for sending an out-of-band notification of a security policy enforcement action to a user of a client, the computer system comprising:
a non-transitory computer-readable storage medium storing executable computer program instructions comprising instructions for:
receiving outbound network traffic sent from the client to a server;
receiving inbound network traffic from the server to the client, the inbound network traffic including a response to the outbound network traffic;
analyzing the received inbound network traffic;
selectively injecting agent code into the inbound network traffic responsive to the analysis of the inbound network traffic, the agent code adapted to execute at the client to instantiate a notification agent at the client, the notification agent adapted to receive the inserted out-of-band notification message and present the notification message to the user of the client;
analyzing the HTTP POST message to determine whether the message contains data violating a data loss prevention (DLP) policy of an enterprise with which the client is associated;

responsive to a determination that the message contains data violating the DLP policy, performing an enforcement action by blocking the message from reaching the server or redacting the data violating the DLP policy from the message;

inserting an out-of-band notification message describing the enforcement action into the response to the outbound network traffic; and sending the response including the inserted out-of-band notification message to the client; and a processor for executing the computer program instructions.

13. The system of claim 12, wherein inserting the out-of-band notification message comprises:

inserting one or more headers describing the notification message into a HTTP RESPONSE message that forms a response to the HTTP POST message in the received outbound network traffic.

14. The system of claim 13, wherein the inserted headers comprise one or more headers marked as containing information that is not part of a HTTP standard.

15. The system of claim 12, wherein the inserted out-of-band notification message comprises a digital signature that serves to authenticate the notification message.

16. The system of claim 12, wherein analyzing the HTTP POST message comprises examining the inbound network traffic from the server to the client to detect inbound network traffic containing a web page acting as an anchor page for a web application provided by the server, and the selectively injecting injects the agent code into the web page acting as the anchor page for the web application and does not inject the agent code into web pages not acting as the anchor page for the web application.

* * * * *